FIG.1
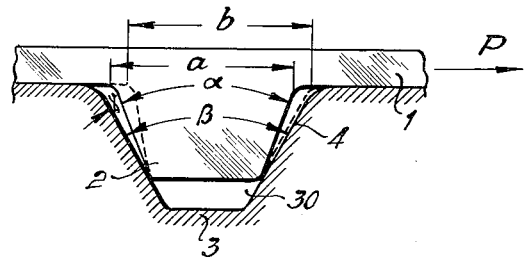
FIG.2        FIG.3
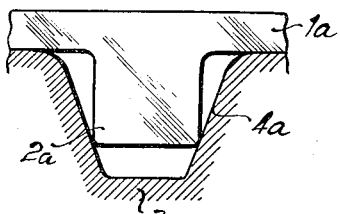 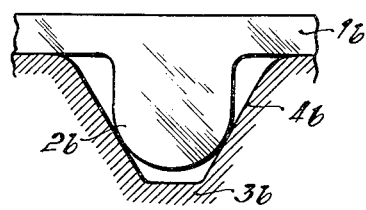
FIG.4        FIG.7
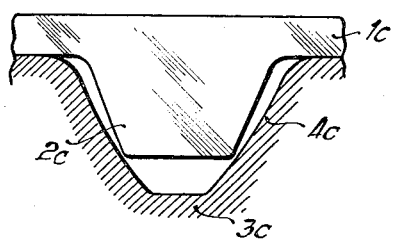 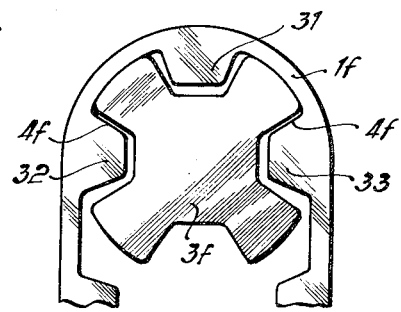
FIG.5        FIG.6
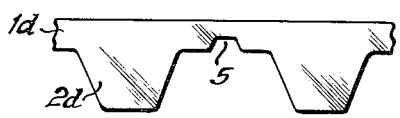 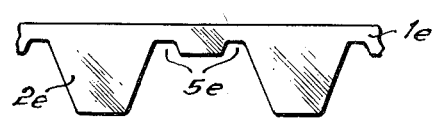
INVENTOR
Reinhold E. Szonn

United States Patent Office 2,987,932
Patented June 13, 1961

2,987,932
ELASTIC TOOTH MEANS
Reinhold E. Szonn, Hannover, Germany, assignor to Wilhelm Herm. Müller & Co. Kommanditgesellschaft, Hannover, Germany
Filed Jan. 9, 1957, Ser. No. 633,232
Claims priority, application Germany Jan. 12, 1956
2 Claims. (Cl. 74—229)

The present invention relates to belts or conveyor belts and, more specifically, concerns an elastic tooth member for meshing with gears and similar elements in a form-closing manner, said elastic tooth member being designed as engaging element, cam or tooth for connection with belts, conveyor belts or the like. The power conveying belt may be designed with or without reinforcing inserts for increasing the pulling strength. The belt may also consist of a band of a desired width which at even distances is provided with tooth-like cams. These cams or teeth may have trapezoidal cross section, rectangular cross section or semicircular cross section.

It is an object of this invention to provide elastic tooth means of the above mentioned type for use in connection with belts such as transmission belts, conveyor belts and the like in order to provide for an improved power transmission while assuring a noiseless and even operation of such belts.

It is also an object of this invention to provide tooth means of the type set forth in the preceding paragraph which will be able to absorb shocks and vibrations while still assuring a satisfactory running operation.

These and other objects and advantages of the invention will appear more clearly from the following specification in connection with the accompanying drawings, in which:

FIGS. 1 to 4 diagrammatically illustrate four embodiments of a belt provided with tooth means according to the invention.

FIGS. 5 and 6 illustrate further modifications of the tooth means according to the invention.

FIG. 7 is a further embodiment of the invention which is particularly suitable for absorbing shocks and vibrations at a minimum distortion angle between belt and gear.

According to the invention, the transmission belt or conveyor belt is simultaneously with the cam or tooth made of an elastic material such as rubber or an elastic synthetic material. According to the present invention, the tooth space angle of the gear with which the tooth or teeth of the belt are to mesh is greater than the tooth angle of the belt whereby the upper tooth portions of the belt can easily deform when entering the gear so that the highest shock forces can be absorbed and the vibrations caused by the gear can be dampened. By "tooth space angle" of the gear as used in the present specification and claims, is meant that angle which is formed by the substantially opposing faces which bound the gear tooth space (angle $\beta$, FIG. 1); and by "tooth angle" of the belt, is meant that angle which is formed by the respective faces of the belt tooth (angle $\alpha$, FIG. 1).

Referring now to the drawings in detail the reference numeral 1 designates a belt with teeth 2 (one only being shown) integral therewith and consisting of rubber or any other suitable elastic material. This tooth belt meshes with a gear 3 of which one tooth space and a portion only of the adjacent teeth is shown in FIG. 1. When the teeth 2 of belt 1 are under no load, the root of the tooth 2 shown in FIG. 1 occupies the position indicated by the character $a$. When the tooth is under load, the root of the tooth will occupy the position indicated by the character $b$ so that the tooth 2 will have the contour partly indicated by the dot-dash lines shown in FIG. 1. During an ordinary meshing engagement between tooth 2 and the corresponding tooth space of the gear 3, the tooth space angle $\beta$ of the tooth space 30 of gear 3 is greater than the tooth angle $\alpha$ by two times the angle $\gamma$. The pulling force P in the belt 1 causes the tooth 2 of the belt 1 to deform in the direction of the pulling force P whereby the tooth 2 moves in the direction of the pulling force P so as to rest against the edge or flank 4 of the tooth space 30 pertaining to the gear 3. Due to the fact that the tooth 2 can thus deform itself, the highest shocks are properly absorbed and the occurring vibrations are dampened.

The above conditions also prevail in connection with the different tooth shapes shown in FIGS. 2 and 3 as will be clearly evident from these figures. The parts corresponding to those of FIG. 1 have been designated with the same numerals as in FIG. 1 but with the additional character $a$.

When relatively high teeth are involved, a special design for the tooth spaces of the gear 3 may be required in order to allow the belt when entering and leaving the tooth space to move properly and freely in view of the involute-like developing movement. To this end, the faces of the tooth spaces may be designed in a concave manner as shown in FIG. 4. The individual parts of FIG. 4 otherwise correspond to those described in connection with FIG. 1 and therefore are designated with the same reference numerals but with the additional character $c$. The deformation and thus the absorption of the maximum shocks and the dampening of the vibrations is assured by allowing the tooth of the belt to lay itself against the respective concave face of the gear.

According to a further embodiment of a belt according to the present invention, a notch 5 is provided in the central portion between two teeth connected to the belt 1$d$ as shown in FIG. 5. As will be evident from FIG. 5, the bottom of notch 5 is (with regard to FIG. 5) located at a higher level than the root of the teeth 2$d$, which means that the groove 5 is in the back of the belt, i.e. that portion of the belt from which the teeth 2$d$ project. If desired, also two notches 5$e$ as shown in FIG. 6 or more notches may be provided in the belt between two adjacent teeth. In this way the belt will obtain a greater flexibility and will move into the tooth space of the gear in a smoother manner.

The belts are so designed that the head of the gear will abut the tooth space in the belt. This contact will yield the fixed pitch determined ratio between belt and gear.

The elastic contact of the tooth element in connection with the belt and the required absorption of the maximum shocks and vibrations while maintaining the torsion angle between belt and gear to a minimum, which torsion angle is ordinarily caused by air between belt tooth and tooth space of the gear, can be obtained by a certain deliberate displacement of the pitch of the tooth belt and gear relative to each other. Thus, for instance, the gears may be increased over the purely calculated value in order with increased width of the tooth space of the gear to obtain a still larger degree of efficiency for the cushioning of the maximum shocks and in order during the standstill of the belt and gear due to the mutual bracing or pressure between the teeth of the belt and the tooth spaces of the gears under normal load to obtain a maximum precision as to the distortion angle between the belt and the gear.

Such a gear is shown in FIG. 7, according to which by increasing the diameter over the purely calculated value a mutual bracing between the teeth of the belt and the tooth spaces of the gear will occur. While with the intermediate tooth 31 of the belt 1$f$ there is an air gap at both faces of the tooth 31, the faces of the teeth 32 and 33 of the belt teeth rest symmetrically against the adjacent faces of the gear 3f so that a mutual bracing will occur within the range of the looping angle.

In general, the angle γ should be at least 2.5° and may vary from 2.5° to 10°.

It is, of course, to be understood that the present invention is, by no means, limited to the particular constructions shown in the drawings but also comprises any modifications within the scope of the appended claims.

What I claim is:

1. In combination: a belt provided with trapezoidal elastic teeth evenly spaced from each other by tooth spaces, and a spur gear having trapezoidal teeth in mesh with the respective adjacent tooth spaces of said belt, the pitch of the belt teeth and the pitch of the spur gear teeth being the same, each two adjacent flanks of two adjacent teeth of said gear confining with each other an angle larger than the angle defined by the flanks of each belt tooth, whereby said elastic belt teeth after entering the respective tooth spaces of said gear first linearly contact the sides of the tooth spaces of said gear and thereafter on being subjected to pulling load fully contact the sides of said tooth spaces.

2. In combination: a belt having a back and elastic trapezoidal teeth protruding from said back and normally evenly spaced from each other by tooth spaces, a rotatable spur gear having circumferentially arranged trapezoidal teeth substantially evenly spaced from each other and radially extending to such an extent as to engage that surface of said tooth spaces of said belt which is remotest from the axis of rotation of said spur gear, the pitch of the belt teeth and the pitch of the spur gear teeth being the same, the width of the tooth portion of the spur gear teeth which engages the tooth spaces of said belt having a width less than the width of said tooth spaces so that in idling position of said belt the belt teeth will have substantially linear contact with the flanks of the spur gear teeth but will contact at least the major surface of the respective flank of the adjacent spur gear tooth engaged thereby when said belt is under full load, those portions of said tooth spaces which are engaged by the radially outermost areas of said spur gear teeth being provided with at least one transverse groove extending over the entire width of the belt and being open toward the spur gear.

References Cited in the file of this patent

UNITED STATES PATENTS

| | | |
|---|---|---|
| 1,818,798 | Freedlander | Aug. 11, 1931 |
| 2,157,061 | Siegling | May 2, 1939 |
| 2,281,148 | Freedlander | Apr. 28, 1942 |
| 2,753,980 | Ballard | July 10, 1956 |
| 2,770,977 | Beckadolph et al. | Nov. 20, 1956 |
| 2,815,671 | Talipsky et al. | Dec. 10, 1957 |

FOREIGN PATENTS

| | | |
|---|---|---|
| 423,753 | Italy | July 26, 1947 |
| 435,039 | Italy | May 7, 1948 |